(No Model.)  2 Sheets—Sheet 1.

H. WIARD & J. L. JUDD.
CULTIVATOR.

No. 407,628. Patented July 23, 1889.

WITNESSES:
C. L. Bendixon
J. J. Laass

INVENTORS:
Harry Wiard
James L. Judd
BY
Duell, Laass & Duell
ATTORNEYS (No Model.) 2 Sheets—Sheet 2.

H. WIARD & J. L. JUDD.
CULTIVATOR.

No. 407,628. Patented July 23, 1889.

WITNESSES:
C. L. Bendixon
J. J. Laass

INVENTORS
Harry Wiard
James L. Judd
BY
Duell, Laass & Duell
ATTORNEYS

UNITED STATES PATENT OFFICE.

HARRY WIARD AND JAMES L. JUDD, OF SYRACUSE, NEW YORK.

CULTIVATOR.

SPECIFICATION forming part of Letters Patent No. 407,628, dated July 23, 1889.

Application filed December 3, 1888. Serial No. 292,480. (No model.)

*To all whom it may concern:*

Be it known that we, HARRY WIARD and JAMES L. JUDD, of Syracuse, in the county of Onondaga, in the State of New York, have invented new and useful Improvements in Cultivators, of which the following, taken in connection with the accompanying drawings, is a full, clear, and exact description.

This invention relates to the attachment of the handles and standards or tooth-shanks to the frame of a cultivator; and the invention consists, first, in adjustably connecting the handles to the frame, so as to allow said handles to be shifted in their position in relation to the line of draft, and thus permit the cultivator to be guided more closely to the row of plants when desired; secondly, in supporting the handles by props formed in one piece with a base mounted on and fastened to the adjustable rear cross-bars of the cultivator, and thus bracing the connection of said cross-bars; thirdly, in certain peculiarities of the details of the attachment of the handles; fourthly, in novel devices for adjustably connecting the standards or tooth-shanks to the frame, so as to permit slight variations of the inclinations of the said standards or shanks without the employment of vertical slots in the latter, which slots have been found unreliable for holding the attaching-bolts, and thus failing to sustain the standards in their adjusted position; fifthly, in a novel construction of the attaching ends of the outermost standards, which allows said standards to be attached directly to the frame and to be adjusted both in its angle of inclination and in its angle in relation to the line of draft without the employment or intervention of blocks or gibs; and the invention furthermore consists in certain novel features of the detail construction of the aforesaid parts and their connections, all as hereinafter more fully described, and specifically set forth in the claims.

Figure 1:
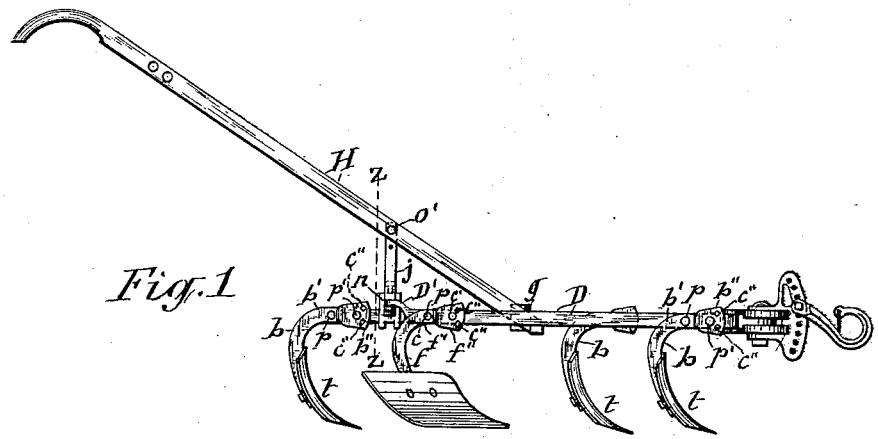
Figure 2:
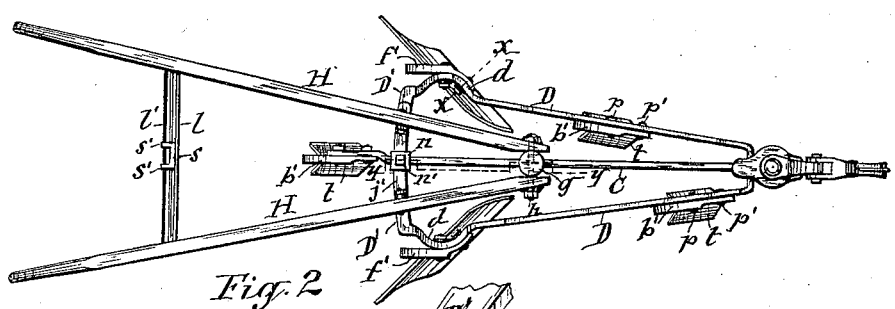
Figure 3:
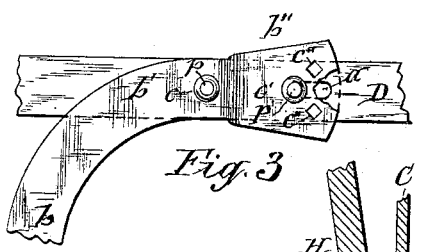
Figure 4:
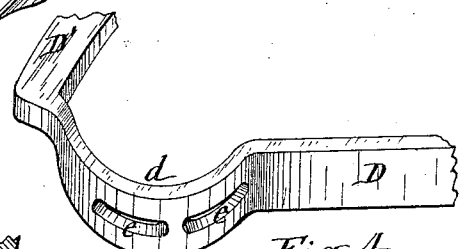
Figure 6:
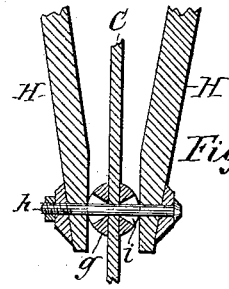
Figure 5:
Figure 12:
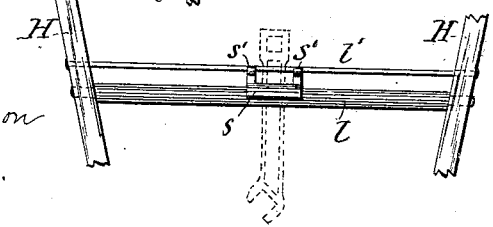
Figure 7:
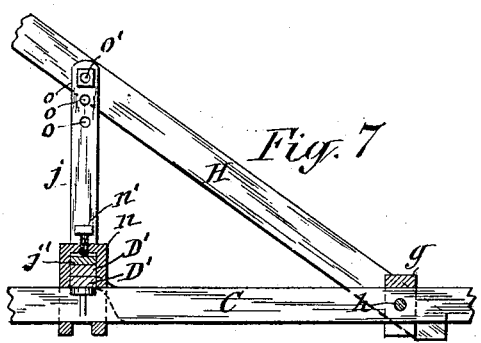
Figure 8:
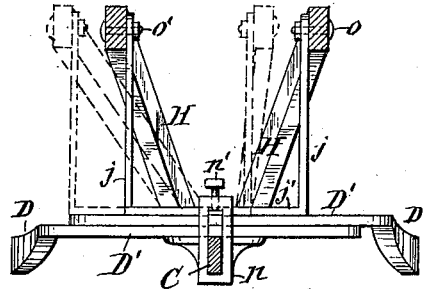
Figure 10:
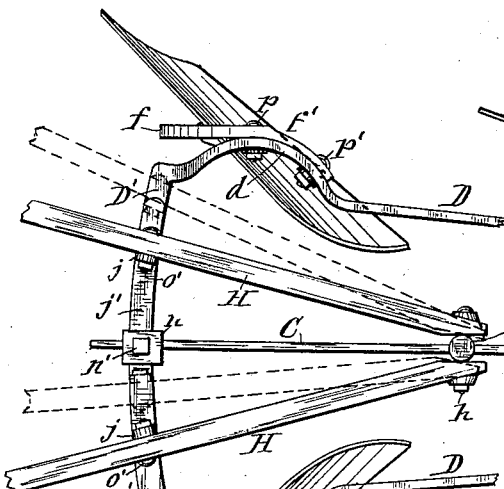
Figure 9:
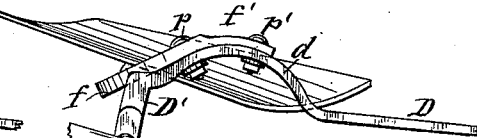
Figure 11:
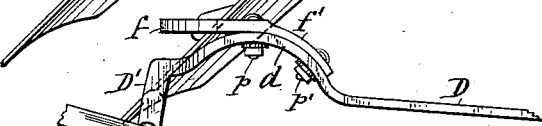

In the annexed drawings, Figure 1 is a side elevation of our improved cultivator. Fig. 2 is a plan view of the same. Fig. 3 is an enlarged detail view of the attachment of one of the standards or tooth-shanks to the frame.
Fig. 4 is an enlarged perspective view of that portion of the frame to which one of the outermost teeth is attached. Fig. 5 is an enlarged vertical transverse section on line $x\ x$, Fig. 2. Fig. 6 is an enlarged horizontal transverse section of the attachment of the front ends of the handles, taken on the line of the attaching-bolt. Fig. 7 is an enlarged vertical longitudinal section of the attachment of the handles, taken on line $y\ y$, Fig. 2. Fig. 8 is an enlarged rear end view of the frame and handle-supports, taken in the plane Z Z, Fig. 1. Figs. 9 and 10 are enlarged plan views showing the plow-points in outwardly-casting positions and in different angles in relation to the line of draft. Fig. 11 is a plan view showing the plow-points in inwardly-casting positions, and Fig. 12 is a plan view of that portion of the handles which is provided with the device for carrying the wrench.

Similar letters of reference indicate corresponding parts.

The frame of the cultivator is constructed similar to that shown in our prior patent of September 16, 1884, No. 305,080—*i. e.*, it is composed chiefly of a central longitudinal draft-bar C, to the front end of which are hinged in any suitable manner the front ends of the side bars D D, which extend divergent therefrom and terminate at their rear ends with horizontal segmental inwardly-extending spreader-arms D' D', which lap one upon the other and lie across the top of the rear end portion of the central bar, secured together in the manner hereinafter explained.

H H denote the handles, which are disposed with their front ends convergent to the central longitudinal bar C and are adjustably connected to said bar, preferably by means of rounded cheek-pieces $g$, rigidly secured to opposite sides of said bar, against which cheek-pieces the front ends of the handles rest, and a coupling-bolt $h$ passes transversely through the end portions of the handles and intervening cheek-pieces $g$ and bar C. These cheek-pieces we prefer to form of a cylindrical block straddling vertically the bar C. The bolt-hole $i$ in the said block is flared in a horizontal plane from the bar C outward, so as to afford the bolt $h$ sufficient lateral play to allow the rear or free ends of the handles to be swung laterally toward either side of the cultivator and to be adjusted in their position in relation to the line of draft as may be desired. The free ends of the handles we support adjustably in their position on the frame, preferably by two props $j\ j$, which may be and are preferably united or formed in one piece, with a horizontal bar $j'$ at the base, similar to a U-shaped frame or brace, where they are mounted adjustably on the segmental arms $D'\ D'$, and secured thereto by means of a clip $n$, which embraces the bar $j'$, arms $D'\ D'$, and subjacent portion of the central bar C, and is provided with a set-screw $n'$, by which it is fastened in its adjusted position.

The upper ends of the props are each provided with holes $o\ o$ at different elevations for the reception of the bolt $o'$, by which the handle is attached to the prop, said holes allowing the handles to be supported at different elevations, as may be desired.

$b\ b$ represent standards or shanks, to which the teeth or cultivator-points $t\ t$, of any suitable shape, are attached. These standards are each formed with a forward extension $b'$, terminating with a flat vertically-enlarged head $b''$. The standard is pivotally connected at a point intermediate of the length of the extension $b'$ to the side of one of the bars D or C in any suitable manner, preferably by a bolt $p$, passing through a hole $c$ in the aforesaid part of the standard and through a coinciding hole in the bar of the frame, and fastened by a nut on said bolt.

In order to sustain the standard adjustably in its angle of inclination, we provide the head $b''$ thereof with a bolt-hole $c'$ and bolt-holes $c''\ c''$, which latter are a greater distance from the bolt-hole $c$ or pivotal connection of the standard and also at different elevations than the bolt-hole $c'$, for the purpose hereinafter explained. The portion of the bar of the frame immediately back of the head $b''$ of the standard is provided with a horizontal slot $a$, and a bolt $p'$ passes through one of the holes in the said head and through the aforesaid slot, and is provided with a nut by which to tighten said bolt.

By removing the bolt $p'$ and swinging the standard $b$ back or forward on the bolt $p$, and inserting the bolt $p'$ through one of the holes $c''$ and slot $a$, the aforesaid standard can be set into the desired angle of inclination.

The object of the before-described peculiar relative arrangement of the bolt-holes $c'\ c''\ c''$ in the head of the standard in connection with the horizontal slot $a$ in the frame is to permit of a slight variation in the angle of inclination of the standard without employing a vertical slot in either of the said parts, experience having proven that inasmuch as such slots are in the direction of the strain they are unreliable for confining the standard in its required position.

The bolt-holes $c''\ c''$ are disposed farther from the hole $c$ than the hole $c'$, in order to obtain ample metal around said holes in the head $b''$, and said arrangement requires the slot $a$ in the frame. Said slot, being horizontal or at right angles to the direction of the strain, effectually prevents the slipping of the bolt $p'$ and accidental shifting of the shank $b$. The outermost standards $f\ f$ require not only the aforesaid vertical adjustment, but also a lateral adjustment, so as to allow them to be set at different angles in relation to the line of draft, and thus adapt the teeth or points on said standard to cast the earth more or less to or from the rows of plants at opposite sides of the cultivator. In order to effect the said two adjustments of the outermost standard $f$ by a direct attachment of said standard to the frame and without the intervention of blocks or gibs, which increase the number of joints to be fastened, and are consequently unreliable, we form the rear portion of each of the side bars D with a segmental outward deflection $d$, disposed in a horizontal plane similar to those shown in our prior patent hereinbefore referred to. Said deflected portion $d$ is provided with horizontal slots $e\ e$, as shown in Fig. 4 of the drawings, for the reception of the bolts $p\ p'$, by which the standard $f$ is attached. Said standard is formed with a forward extension $f'$, curved in a horizontal plane in conformity to the curvature of the deflection $d$, and terminating with a vertically-enlarged head $f'''$, similar to the standards $b$; but the inner side of the head $f''$ is formed concave. The extension $f'$ of the standard $f$ is provided with the bolt-hole $c$, and the head $f''$ has the bolt-hole $c'$ and holes $c''\ c''$, which latter are at different distances from the hole $c$ in the same manner as those of the standards $b$, and is attached in the same manner by a bolt $p$, passing through the hole $c$ and one of the slots $e$, and a bolt $p'$, passing through one of the holes $c'$ or $c''$ and the other slot $e$, and secured by nuts on said bolts. The longitudinal slots $e\ e$ allow the standard to be shifted forward or rearward on the segmental part $d$ of the frame, and by said shifting the tooth or point of said standard is caused to stand at different angles in relation to the line of draft and more or less divergent from the frame, so as to cast more or less earth to or from the row of plants, as may be desired.

The concave bearing of the head $f''$ on the segmental portion $d$ of the frame allows the standard to be swung vertically and set into different angles of inclination, in the manner hereinbefore described, without crowding the standard laterally out of its vertical position.

$l$ and $l'$ represent, respectively, the wooden round and metal rod, which are parallel and extend from one handle horizontally to the other handle and tie the free ends of the handles together. To the central portion of said wooden rail at the side adjacent to the rod we attach a metal shoe $s$, having prongs $s'$, which are provided with notches through which the rod $l'$ passes, said engagement serving to sustain the shoe in its position. The opening $s''$ between the shoe and rod $l'$ is of a size to allow a wrench to be inserted, as illustrated in Fig. 12 of the drawings.

Having described our invention, what we claim as new, and desire to secure by Letters Patent, is—

1. The combination, with a cultivator-frame formed with a central longitudinal bar, of convex cheek-pieces rigidly secured to opposite sides of said central bar, handles secured at their front ends to the convex sides of the said cheek-pieces and adapted to slide thereon, and two standards formed in one piece mounted adjustably on the rear end of the frame and supporting the handles, substantially as set forth.

2. The combination of a cultivator-frame formed with a central longitudinal bar, convex cheek-pieces secured to opposite sides of said bar and provided with a transverse bolt-hole flared from the bar outward, handles resting with their front ends against the convex sides of said cheek-pieces, a bolt passing through the handles and the aforesaid flaring hole of the cheek-pieces and through the longitudinal bar, and props mounted laterally adjustably on the frame and supporting the handles, substantially as described and shown.

3. The combination of the cultivator-frame formed with integral spreader-arms at the rear end, handles adjustably connected at their front ends to the said frame, and a U-shaped frame or brace connected to the handles and mounted laterally adjustably on the aforesaid spreader-arms and clamped thereon in their adjusted position, substantially as set forth.

4. The combination of a cultivator-frame formed with a central longitudinal bar and side bars hinged at their front ends to the central bar and terminating with overlapping inward-extending spreader-arms at their rear ends lying across the central bar, the handles connected adjustably at their front ends to the aforesaid central bar, props united at their bases by a horizontal cross-bar formed integral therewith and seated thereby on the overlapping ends of the aforesaid spreader-arms and connected at their upper ends to the handles, and a clip embracing the rear end portion of the central bar and the overlapping spreader-arms and base of the props and adjustably clamping said parts together, substantially as described and shown.

5. In combination with the cultivator-frame formed with a central longitudinal bar and side bars hinged at their front ends to the said central bar and terminating with overlapping inward-extending spreader-arms at their rear ends, a cylindrical block straddling vertically the central bar, the handles resting with their front ends against opposite sides of said block, a tie-bolt passing transversely through said ends of the handle and through the intervening block and bar, props formed in one piece with a horizontal bar at the base and seated thereby upon the aforesaid spreader-arms, and a clip embracing the rear end portion of the central bar, segmental arms, and base of the props, and adjustably clamping said parts together, substantially as described and shown.

6. The combination of the frame provided with the horizontal slot $a$, the standard $b$, pivotally connected to said frame and formed with the extension $b'$, provided with the bolt-hole $c'$ and with bolt-holes $c''$ $c''$ at a greater distance from the pivotal connection of the standard and at different elevations than the bolt-hole $c'$, and a bolt passing through one of said holes and through the slot $a$, substantially as described and shown.

7. The combination of the cultivator-frame having the side bar D, formed with the segmental curved portion $d$, disposed in a horizontal plane, and a standard or tooth-shank formed with a correspondingly horizontally-curved attaching end terminating with a concave bearing and clamped adjustably and directly on the aforesaid curved portion of the side bar, substantially as described and shown.

8. The combination of the cultivator-frame having the side bar D, formed with the segmental curved portion $d$, disposed in a horizontal plane and provided with horizontal slots $e$ $e$, the standard $f$, formed with a correspondingly horizontally-curved attaching end terminating with a concave bearing and provided with holes, and attaching-bolts passing through said holes and slots $e$ $e$ and adjustably clamping the said standard on the side bar, substantially as described and shown.

9. The combination of the cultivator-frame having the side bar D, formed with the segmental outwardly-deflected portion $d$, disposed in a horizontal plane, and provided with the horizontal slots $e$ $e$, the standard $f$, formed with the forward extension $f'$, terminating with the vertically-enlarged portion $f''$, concaved on its inner side and provided with the bolt-hole $c$ and bolt-holes $c'$ $c''$ $c''$ at different elevations, and attaching-bolts passing, respectively, through the hole $c$ and one of the holes $c'$ $c''$ $c''$ and through the slots $e$ $e$, substantially as described and shown.

In testimony whereof we have hereunto signed our names, in the presence of two witnesses, at Syracuse, in the county of Onondaga, in the State of New York, this 28th day of November, 1888.

HARRY WIARD. [L. S.]
JAMES L. JUDD. [L. S.]

Witnesses:
JOHN J. LAASS,
HARRIE B. SMITH.